United States Patent Office 2,884,421
Patented Apr. 28, 1959

2,884,421

6-FLUORO-17α,21-EPOXY-4-PREGNENES

Barney J. Magerlein, George B. Spero, John A. Hogg, and William P. Schneider, Kalamazoo, Mich., assignors to The Upjohn Company, Kalamazoo, Mich., a corporation of Michigan No Drawing. Application June 9, 1958
Serial No. 740,593

2 Claims. (Cl. 260—239.55)

This invention relates to 6,21-difluoro-21-desoxyhydrocortisone and 6,21-difluoro-21-desoxycortisone and is more particularly concerned with 6α,21-difluoro-21-desoxyhydrocortisone, 6α,21-difluoro-21-desoxycortisone and 9α-halo derivatives of such compounds, and to processes for the production thereof.

The compounds of this invention, 6,21-difluoro-21-desoxyhydrocortisone and 6,21-difluoro-21-desoxycortisone, possess valuable anti-rheumatoid arthritic, anti-inflammatory and glucocorticoid activities in marked degree. Thus, for example, 6α,21-difluoro-21-desoxyhydrocortisone has been found to exhibit approximately two times the glucocorticoid activity of hydrocortisone, eight to twenty times the anti-inflammatory activity of hydrocortisone, and in mineralocorticoid tests to induce sodium excretion 1.35 times and water loss two times the normal rate. These compounds are useful in the treatment of inflammatory conditions of the skin, eyes and ears of humans and of valuable domestic animals, as well as contact dermatitis and other allergic reactions. Compositions containing the compounds of the present invention can be prepared for animal or human use by incorporating them in any one of the several dosage forms suitable for such use. Administration of the novel steroids thus can be in conventional dosage forms, such as pills, tablets, capsules, solutions, syrups or elixirs for oral use, or in liquid forms which are adaptable to the natural and synthetic cortical steroid hormones for injectable products. The novel compounds can also be administered topically in the form of ointments, creams, lotions and the like, with or without coacting antibiotics, germicides or other materials forming advantageous combinations therewith. As will hereinafter be described in greater detail, these compounds are additionally useful as intermediates in the production of 6,21-difluoro-9α-halo-21-desoxyhydrocortisone and 6,21-difluoro-9α-halo-21-desoxycortisone. The 9α-halo derivatives are of particular importance because they possess a combination of high anti-inflammatory and glucocorticoid properties with low concomitant mineralocorticoid activities.

The compounds of this invention can be prepared in accordance with the following reactions:

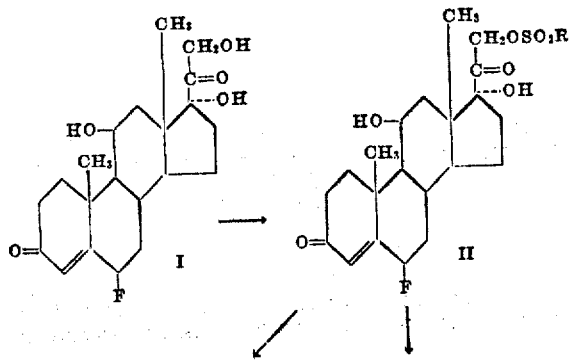

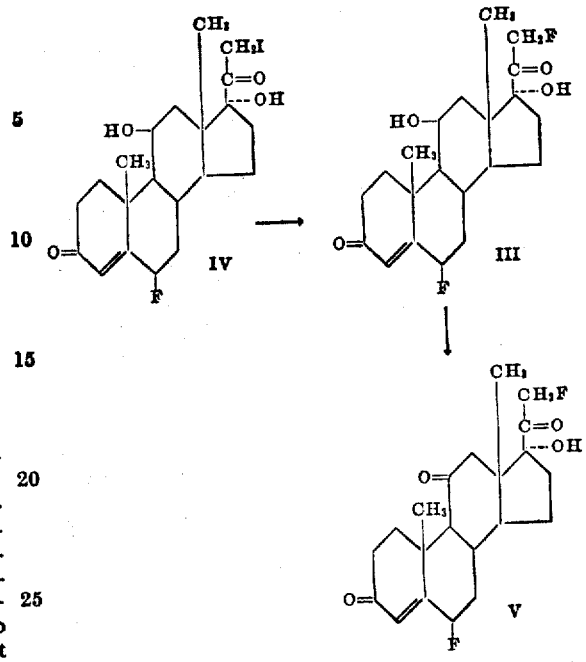

wherein R is an organic radical, particularly a hydrocarbon radical containing from one to ten carbon atoms, inclusive, such as methyl, ethyl, phenyl, tolyl, naphthyl, or the like, methyl being preferred.

As indicated above and described in greater detail below, the reactions embodied in the processes characterizing this invention are susceptible of variation in the specific steps leading to the final products III and V, the precise sequence selected being determined by such factors as economics and convenience.

It is an object of the present invention to provide 6,21-difluoro-21-desoxyhydrocortisone (III) and 6,21-difluoro-21-desoxycortisone (V) and their 9α-halo derivatives. Another object of this invention is to provide 6α,21-difluoro-21-desoxyhydrocortisone, 6α,21-difluoro-21-desoxycortisone and the 9α-halo derivatives of each. A further object is to provide a process for the production of 6,21-difluoro-21-desoxyhydrocortisone, 6,21-difluoro-21-desoxycortisone and the 9α-halo derivatives thereof. An additional object is to provide a process for the production of 6α,21-difluoro-21-desoxyhydrocortisone, 6α,21-difluoro-21-desoxycortisone and their 9α-halo derivatives.

The process of the present invention comprises treating 6-fluoro-11β,17α,21-trihydroxy-4-pregnene-3,20-dione (6-fluorohydrocortisone) (I) with an organic sulfonyl halide to obtain the corresponding 21-ester (II), a 21-alkyl or aryl sulfonate of 6-fluoro-11β,17α,21-trihydroxy-4-pregnene-3,20-dione, and thereafter treating the thus produced 21-alkyl or aryl sulfonate with a fluorinating agent to obtain the corresponding 6,21-difluoro-11β,17α-dihydroxy-4-pregnene-3,20-dione (III). If desired, the 6,21-difluoro product above can be oxidized to give the corresponding 6,21-difluoro-17α-hydroxy-4-pregnene-3,11,20-trione (V). If the 11-keto analogue of the starting material is employed, the product (V) is obtained without the oxidation step. Alternatively, the 6-fluoro-11β,17α,21-trihydroxy-4-pregnene-3,20-dione 21-alkyl or aryl sulfonate can be reacted with an iodinating agent to produce the corresponding 21-iodo steroid, which can be fluorinated to yield the 21-fluoro steroid (III).

The starting steroids for the compounds and process of the present invention are 6-fluorohydrocortisone and 6-fluorocortisone and are prepared in accordance with the procedures of Preparations 1 through 11 herein. The preferred compounds containing the 17(20)-double bond have the cis configuration because they are convertible in higher yields in the oxidative hydroxylation step than are the trans isomers, although both are operative.

In carrying out the process of this invention, 6-fluorohydrocortisone is treated with an organic sulfonyl halide such as methanesulfonyl chloride, toluenesulfonyl chloride, toluenesulfonyl bromide, benzenesulfonyl chloride, naphthylsulfonyl chloride, or the like, the methanesulfonic acid halides, especially methanesulfonyl chloride, being preferred. In the preferred embodiment of this invention, the starting steroid is usually reacted with the alkyl or aryl sulfonyl halide in solution in a solvent such as pyridine, benzene, toluene, or the like. Where such solvents as benzene and toluene are employed, an amount of an amine base such as pyridine at least equal to the molar amount of the sulfonyl halide should also be present to react with the halogen acid formed. Reaction of the alkyl or aryl sulfonyl halide is conducted preferably at temperatures between minus ten and plus sixty degrees centigrade, provided that at the lower temperatures the solvent has not solidified. Thus, for pyridine, dioxane, toluene, or the like, temperatures in the range of zero to ten degrees centigrade can be used, while for benzene only temperatures above five degrees centigrade are suitable because of the relatively high melting point of benzene. The reaction time is usually between about thirty minutes and eight hours, after which the product, 6-fluoro-11β,17α,21-trihydroxy-4-pregnene-3,20-dione 21-alkyl or aryl sulfonate (II), is recovered in a conventional manner, such as, for example, by evaporating the solvent until a dry residue is obtained or by diluting the reaction mixture with water and precipitating the product with dilute hydrochloric acid.

The 6-fluoro-11β,17α,21-trihydroxy-4-pregnene-3,20-dione 21-alkyl or aryl sulfonate is then reacted with a fluorinating agent such as potassium fluoride, silver fluoride or antimony fluoride in an inert solvent such as dimethylsulfoxide, acetonitrile, dimethylformamide or ethylene glycol solution, the preferred combination being potassium fluoride in dimethylsulfoxide. The reaction is advantageously conducted under continuous heating, and it proceeds generally for a period of about six to 24 hours, fifteen to twenty hours usually being sufficient. The reaction mixture is then diluted with an organic solvent such as methylene chloride, chloroform, benzene, and the like, and purified in a conventional manner, as, for example, by chromatography or solvent extraction.

An advantage of this fluorinating method is that it is productive of minor amounts of 6-fluoro-11β-hydroxy-17α,21-epoxy-4-pregnene-3,20-dione (Compound VI) of the following structural formula:

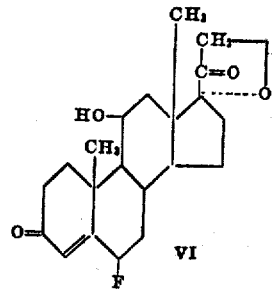

Compound VI (the 6α- or 6β-epimer) possesses glucocorticoid and anti-inflammatory properties similar to those of Compounds III and V, though to a modified degree, and possesses particularly marked diuretic activity in that it causes a loss of salt and water which makes it especially valuable in the management of chronic congestive heart failure and in the treatment of cirrhosis of the liver, the nephrotic syndrome, and the treatment of eclampsia and pre-eclampsia.

Alternatively, the 6-fluoro-11β,17α,21-trihydroxy-4-pregnene-3,20-dione 21-alkyl or aryl sulfonate can first be converted to the corresponding 21-iodo compound (IV), which is readily convertible to the 21-fluoro steroid. The 21-iodo compound is prepared by reacting the said 21-alkyl or aryl sulfonate with an alkali metal iodide, e.g., sodium, potassium or lithium iodide, in an oxygenated hydrocarbon solution such as an alkanone solution, e.g., acetone. A molar excess of the iodide (three to twenty moles of iodide per mole of steroid) is generally preferred for this reaction. The reaction mixture containing the 21-alkyl or aryl sulfonate and the alkali metal iodide in solution is heated to reflux for a period of about three minutes to thirty minutes. The thus produced 6-fluoro-21-iodo-11β,17α-dihydroxy-4-pregnene-3,20-dione can then be isolated by evaporating the solvent. For the subsequent reaction, the 21-iodo steroid can be used either in purified form as a product of recrystallization from such organic solvents as acetone, ethanol, or the like, or it can be employed directly as a crude product in the next step of the synthesis.

The 21-iodo steroid, dissolved in a solvent such as acetonitrile, dimethylformamide or ethylene glycol, is treated with a metal fluoride such as silver fluoride, antimony fluoride, potassium fluoride, or the like, acetonitrile and silver fluoride being preferred. The metal fluoride should be added in small quantities at intervals, and the reaction mixture should be protected from light during the reaction period, which usually ranges from about one-half to six hours. The reaction mixture is then concentrated and the product extracted as in previous purification steps to yield essentially pure 6,21-difluoro-11β,17α-dihydroxy-4-pregnene-3,20-dione.

The foregoing reactions constituting either the principal or alternative routes can likewise be conducted on the corresponding 11-keto analogues.

The oxidation of 6,21-difluoro-11β,17α-dihydroxy-4-pregnene-3,20-dione can be carried out by any known method, such as, for example, by oxidizing the said 6,21-difluoro steroid in acetic acid solution with chromium trioxide, using molar quantities or a slight excess, such as from ten to thirty percent excess, or by oxidizing with a haloamide or imide of an acid, such as N-bromoacetamide, N-chlorosuccinimide, or N-bromosuccinimide dissolved in pyridine, dioxane, or other suitable solvents. At the conclusion of the desired oxidation reaction, the oxidant is generally destroyed by addition of methyl alcohol, ethyl alcohol, and the like for the chromic acid oxidant or a bisulfite for N-bromoacetamide, N-bromosuccinimide and other N-halo acyl amides and imides. Thereafter, the resulting 6,21-difluoro-17α-hydroxy-4-pregnene-3,11,20-trione is recovered by conventional means, such as by extraction with water-immiscible solvents, e.g., methylene chloride, ether, benzene, toluene or the like, or by chromatography.

As hereinbefore indicated, the compounds of the present invention are additionally useful as intermediates in the production of the valuable 9α-fluoro derivatives by a 9α-halogenation procedure. Thus 6,21-difluoro-11β,17α-dihydroxy-4-pregnene-3,20-dione can be dehydrated with N-bromoacetamide and anhydrous sulfur dioxide by permitting the reaction to continue until a negative acidified potassium iodide-starch test of the reaction mixture is obtained. Dilution with cold water results in the precipitation of 6,21-difluoro-17α-hydroxy-4,9(11)-pregnadiene-3,20-dione, which can be purified by recrystallization from acetone. The crystalline product can then be reacted in methylene chloride-tertiary butyl alcohol solution with perchloric acid and N-bromoacetamide or N-iodosuccinimide to produce a reaction mixture from which 6,21-difluoro-9α-bromo-11β,17α-dihydroxy-4-pregnene-3,20-dione or the corresponding 6,21-difluoro-9α-iodo compound can be recovered by precipitation with ice water and recrystallization from acetone. The latter steroids can then be reacted in acetone solution with anhydrous potassium acetate at reflux temperatures to produce 6,21-difluoro-9(11)-oxido-17α-hydroxy-4-pregnene-3,20-dione, which is recoverable from the reaction mixture by chromatography and can be further purified by recrystallization from Skellysolve B hexanesacetone. Reaction of the said 9(11)-oxido compound in methylene chloride solution with aqueous hydrogen fluoride or hydrogen fluoride gas in the presence of tetrahydrofuran at room temperature is productive of 6,9α,21-trifluoro-11β,17α-dihydroxy-4-pregnene-3,20-dione. Substitution of aqueous hydrogen chloride for the hydrogen fluoride above yields 6,21-difluoro-9α-chloro-11β,17α-dihydroxy-4-pregnene-3,20-dione. If desired, either the 9α-fluoro or chloro product can be oxidized, for example, with N-bromoacetamide in pyridine solution to give 6,9α,21-trifluoro-17α-hydroxy-4-pregnene-3,11,20-trione or the corresponding 9α-chloro compound.

The steps of the foregoing process for the preparation of the 9α-halo steroids can be inverted without departing from the basic concepts of the process. Thus, 6-fluoro - 11β,17α - dihydroxy - 21 - acyloxy - 4 - pregnene-3,20-dione can be selected as the starting steroid, the said 21-acyloxy compounds being prepared in the manner customarily employed for acylating hydrocortisone, for example, by reaction of the appropriate 21-hydroxy steroid with the anhydride or acid halide of an organic carboxylic acid containing from one to twelve carbon atoms, inclusive, under conventional esterifying conditions. The said 21-acyloxy steroid can be dehydrated as by reaction with N-bromoacetamide and anhydrous sulfur dioxide in pyridine and the 9α,11β-bromohydrin formed by treatment with N-bromoacetamide in an acidic aqueous organic solution. The 9(11)-oxido group can then be introduced by reaction of the bromohydrin with potassium acetate in acetone. Fluorination of the resulting compound, followed by hydrolysis, as with potassium bicarbonate, produces 6,9α-difluoro-11β,17α,21-trihydroxy-4-pregnene-3,20-dione, which can be fluorinated at the 21-position by the steps and methods earlier described.

In the foregoing processes, it should be understood that the corresponding 6β-halo epimer can be utilized at any stage and the 6α-epimer obtained at appropriate intermediate stages by treatment of the 6β-compound in an organic solvent such as chloroform, at temperatures of zero degrees centigrade or slightly lower, with an anhydrous mineral acid, such as hydrochloric acid, in the presence of alcohol. Such temperatures should be maintained throughout the period of addition of the acid. The reaction mixture can then be washed with successive portions of dilute alkali and water and evaporated under reduced pressure to obtain the 6α-epimer in high yield.

The following preparations and examples are illustrative of the process and products of the present invention but are not to be construed as limiting.

PREPARATION 1

*3-ethylene glycol ketal of methyl 3,11-diketo-5α,6α-oxido-17(20)-[cis]-pregnen-21-oate*

To a solution of five grams of the 3-ethylene glycol ketal of methyl 3,11-diketo-4,17(20)-[cis]-pregnadien-21-oate, prepared in the manner described in U.S. Patent 2,707,184, in 100 milliliters of chloroform was added a chilled solution of 1.9 grams of perbenzoic acid dissolved in 31.5 milliliters of chloroform. The solution was maintained at about four degrees centigrade for 24 hours, and then at room temperature for 72 hours. The solution was washed with a five percent aqueous solution of sodium bicarbonate and then with water. The chloroform layer was separated, dried and the solvent distilled to give a residue of 5.3 grams of solid. Crystallization of this solid from methanol gave 2.24 grams of product melting at 180 to 195 degrees centigrade, and after two crystallizations from methanol there was obtained pure 3-ethylene glycol ketal of methyl 3,11-diketo-5α,6α-oxido-17(20)-[cis]-pregnen-21-oate melting at 206 to 209 degrees centigrade and having an $[\alpha]_D$ of 37 degrees ($CHCl_3$) and the following analysis:

Calculated for $C_{24}H_{32}O_6$: C, 69.20; H, 7.75. Found: C, 69.59; H, 7.81.

PREPARATION 2

*Methyl 3,11-diketo-5α,6β-dihydroxy-17(20)-allopregnen-21-oate and methyl 3,11-diketo-5α-hydroxy-6β-fluoro-17(20)-allopregnen-21-oate*

To a solution of 1.73 grams of 3-ethylene glycol ketal of methyl 3,11-diketo-5α,6α-oxido-17(20)-[cis]-pregnen-21-oate in sixteen milliliters of methylene chloride was added six milliliters of 48 percent hydrofluoric acid. The heterogeneous mixture was stirred for two hours, made slightly basic with 300 milliliters of five percent sodium bicarbonate solution, and extracted with methylene chloride. The extract was washed, dried, and evaporated to dryness to give 1.62 grams of crude solid. Purification by chromatography gave two fractions: A, 481 milligrams eluted with methylene chloride plus five percent acetone, and B, 921 milligrams eluted with methylene chloride plus ten and twenty percent acetone. Crystallization of fraction A from acetone-Skellysolve B hexanes gave 390 milligrams of methyl 3,11-diketo-5α-hydroxy-6β-fluoro-17(20)-allopregnen-21-oate, melting point 254 to 260 degrees centigrade. The analytical sample melted at 260 to 263 degrees centigrade.

*Analysis.*—Calculated for $C_{22}H_{29}O_5F$: F, 4.84. Found: F, 4.47.

Fraction B on crystallization from acetone-Skellysolve B hexanes gave 470 milligrams of methyl 3,11-diketo-5α,6β - dihydroxy - 17(20) - allopregnen - 21 - oate, melting point 235 to 245 degrees centigrade. The analytical sample melted at 245 to 248 degrees centigrade.

*Analysis.*—Calculated for $C_{22}H_{30}O_6$: C, 67.67; H, 7.74. Found: C, 67.91; H, 7.62.

PREPARATION 3

*Methyl 3,11 - diketo - 5α - hydroxy - 6β - fluoro - 17(20)-allopregnen-21-oate 3-ethylene ketal*

A mixture of 1.9 grams of methyl 3,11-diketo-5α-hydroxy-6β-fluoro-17(20)-allopregnen-21-oate, 59 milligrams of p-toluenesulfonic acid monohydrate and 31 milliliters of distilled ethylene glycol was added to 800 milliliters of benzene. The mixture was stirred and refluxed for two hours, with the condensate passing through a water trap to remove the water. After reflux the mixture was cooled, washed with water and evaporated to dryness to give a crude solid which on recrystallization from acetone-Skellysolve B hexanes gave 1.96 grams of methyl 3,11 - diketo - 5α - hydroxy - 6β - fluoro - 17(20)-allopregnen-21-oate 3-ethylene ketal, melting point 170 to 173 degrees centigrade.

Following the above procedure, substituting other dihydric alcohols for ethylene glycol, for example, 1,2-propylene glycol, 2,3-butanediol, 1,3-butanediol and 2,3-pentanediol, is productive of the respective 3-alkylene ketals of methyl 3,11-diketo-5α-hydroxy-6β-fluoro-17(20)-allopregnen-21-oate.

PREPARATION 4

*5α,11β,21 - trihydroxy - 6β - fluoro - 17(20) - allopregnen-3-one 3-ethylene ketal*

To a solution of 1.96 grams of methyl 3,11-diketo-5α-hydroxy-6β-fluoro-17(20)-allopregnen-21-oate 3-ethylene ketal in 850 milliliters of anhydrous ether was added 3.7 grams of lithium aluminum hydride. The mixture was stirred for a period of one hour, and 200 milliliters of water was added slowly, the ether phase separating. The aqueous phase was extracted with ethyl acetate and the extracts added to the ether phase. The combined ether-ethyl acetate solution was washed with water, dried and evaporated to dryness under reduced pressure. The crude solid residue was crystallized from acetone-Skellysolve B hexanes to give 1.30 grams of 5α,11β,21-trihydroxy-6β-fluoro-17(20)-allopregnen-3-one 3-ethylene ketal, melting point 197 to 205 degrees centigrade. An additional 226 milligrams was obtained from the mother liquor, melting point 175 to 185 degrees centigrade.

PREPARATION 5

*5α,11β - dihydroxy - 6β - fluoro - 21 - acetoxy - 17(20)- allopregnen-3-one 3-ethylene ketal*

The acetate was prepared by allowing 0.87 gram of 5α,11β,21 - trihydroxy - 6β - fluoro - 17(20) - allopregnen-3-one 3-ethylene ketal to stand overnight in ten milliliters of acetic anhydride and ten milliliters of pyridine. The solution was then poured into ice water to give 0.92 gram of 5α,11β-dihydroxy-6β-fluoro-21-acetoxy-17(20)-allopregnen-3-one 3-ethylene ketal, melting point 140 to 150 degrees centigrade, which on recrystallization from acetone-Skellysolve B hexanes gave 0.77 gram, melting point 149 to 153 degrees centigrade.

Similarly, other 21-organic carboxylic esters of 5α, 11β,21 - trihydroxy - 6β - fluoro - 17(20) - allopregnen-3-one 3-ethylene ketals can be prepared wherein the 21-acyloxy group is formyloxy, propionyloxy, butyryloxy, valeryloxy, hexanoyloxy, heptanoyloxy, octanoyloxy, benzoyloxy, phenylacetoxy, or the like, by contacting 5α,11β,21 - trihydroxy - 6β - fluoro - 17(20) - pregnen - 3-one 3-ethylene ketal with the appropriate acylating agent, e.g., the anhydride or acid halide of the selected acid in a solvent such as benzene, toluene, acetic acid, or the like. A convenient method of preparing the 21-formyloxy ester consists in contacting 5α,11β,21-trihydroxy-6β-fluoro-17(20)pregnen-3-one 3-ethylene ketal with formic acid in the presence of paratoluenesulfonic acid.

PREPARATION 6

*5α,11β,17α - trihydroxy - 6β - fluoro - 21 - acetoxyallopregnane-3,20-dione 3-ethylene ketal*

To a solution of 0.77 gram of 5α,11β-dihydroxy-6β-fluoro - 21 - acetoxy - 17(20) - allopregnen - 3 - one 3-ethylene ketal in 35 milliliters of tertiary butyl alcohol was added one milliliter of pyridine, 1.9 milliliters of N-methylmorpholine oxide peroxide solution, and 13.1 milligrams of osmium tetroxide (9.1 milliliters of tertiary butyl alcohol solution containing 1.44 milligrams of osmium tetroxide per milliliter). The solution was stirred for a period of 2.5 hours and fifteen milliliters of five percent sodium hydrosulfite was added. Stirring was continued for an additional ten minutes, at which time 0.7 gram of finely ground synthetic magnesium silicate was mixed into the solution for a period of twenty minutes and then removed by filtration. The filtrate was evaporated to dryness under reduced pressure at a temperature of less than fifty degrees centigrade. The residue was dissolved in methylene chloride, washed with water, dried and evaporated to dryness. This residue was crystallized from acetone-Skellysolve B hexanes to give 0.47 gram of 5α,11β,17α-trihydroxy-6β-fluoro-21-acetoxyallopregnane-3-20-dione 3-ethylene ketal, melting point 220 to 228 degrees centigrade.

PREPARATION 7

*5α,11β,17α - trihydroxy - 6β - fluoro - 21 - acetoxyallopregnane-3,20-dione*

A solution of 0.47 gram of 5α,11β,17α-trihydroxy-6β-fluoro-21-acetoxyallopregnane-3,20-dione 3-ethylene ketal in 35 milliliters of acetone and four milliliters of 1 N sulfuric acid solution was gently boiled on a steam bath for ten minutes, cooled and neutralized with dilute sodium bicarbonate solution. Addition of water followed by cooling gave 0.33 gram of 5α,11β,17α-trihydroxy-6β-fluoro-21-acetoxyallopregnane-3,20-dione, melting point 230 to 240 degrees centigrade.

PREPARATION 8

*6β - fluoro - 11β,17α - dihydroxy - 21 - acetoxy - 4 - pregnene-3,20-dione (6β-fluorohydrocortisone acetate)*

A solution of 100 milligrams of 5α,11β,17α-trihydroxy-6β-fluoro-21-acetoxyallopregnane-3,20-dione in 4.9 milliliters of acetic acid and 0.1 milliliter of water was refluxed for a period of one hour, cooled, diluted with fifty milliliters of water and evaporated to dryness under reduced pressure. The residue was chromatographed over synthetic magnesium silicate to give one fraction (77 milligrams) eluted with methylene chloride plus ten percent acetone. Crystallization from acetone-Skellysolve B hexanes gave 38 milligrams of 6β-fluoro-11β,17α-dihydroxy-21 - acetoxy - 4 - pregnene - 3,20 - dione (6β - fluorohydrocortisone acetate), melting point 210 to 218 degrees centigrade. Infrared data and ultraviolet data were in agreement with the structure.

PREPARATION 9

*6α - fluoro - 11β,17α - dihydroxy - 21 - acetoxy - 4 - pregnene - 3,20 - dione (6α-fluorohydrocortisone acetate)*

A solution of 0.132 gram of 6β-fluoro-11β,17α-dihydroxy-21-acetoxy-4-pregnene-3,20-dione in twelve milliliters of chloroform and 0.1 milliliter of absolute alcohol was cooled to minus ten degrees centigrade in an ice-salt bath. A stream of anhydrous hydrochloric acid was gently bubbled through the solution for 2.5 hours, during which period the temperature was maintained between minus five and minus fifteen degrees centigrade. The solution was then diluted with 25 milliliters of chloroform, washed with dilute aqueous sodium bicarbonate solution, dried over anhydrous sodium sulfate, and evaporated to dryness under reduced pressure at sixty degrees centigrade. Crystallization of the residue from acetone-Skellysolve B hexanes gave 42 milligrams of the isomerized product, 6α-fluoro-11β,17α-dihydroxy-21-acetoxy-4-pregnene-3,20-dione, which melted at 203 to 210 degrees centigrade.

PREPARATION 10

*6α - fluoro - 11β,17α,21 - trihydroxy - 4 - pregnene - 3,20-dione (6α-fluorohydrocortisone)*

A solution of 1.1 grams of 6α-fluoro-11β,17α-dihydroxy-21-acetoxy-4-pregnene-3,20-dione, one gram of potassium bicarbonate, 100 milliliters of methanol and fifteen milliliters of water were mixed together and purged with nitrogen to remove dissolved oxygen while stirring at 25 degrees centigrade for four hours. The solution was then neutralized by addition of acetic acid and distilled under vacuum to remove the methanol. The residue was extracted with 100 milliliters of methylene dichloride, and the extract was dried over sodium sulfate and passed through a column containing eighty grams of synthetic magnesium silicate. The fraction eluted with Skellysolve B hexanes plus twenty and thirty percent acetone weighed 770 milligrams, representing a yield of 77.5 percent. Recrystallization of a portion of this crude product from ethyl acetate-Skellysolve B hexanes gave crystals of 6α-fluorohydrocortisone, melting at 192 to 195 degrees centigrade.

PREPARATION 11

*6β - fluoro - 17α,21 - dihydroxy - 4 - pregnene - 3,11,20-trione (6β-fluorocortisone)*

To a solution of 0.5 gram of 6β-fluoro-11β,17α,21-trihydroxy-4-pregnene-3,20-dione, prepared as described in Preparation 8, and one milliliter of pyridine in 35 milliliters of tertiary butyl alcohol was added 250 milligrams of N-bromoacetamide. After maintaining at room temperature for sixteen hours, the reaction mixture was diluted with 25 milliliters of water containing 250 milligrams of sodium sulfite and concentrated to about twenty milliliters, at which point precipitation occurred. The thus obtained precipitate was collected on a filter and recrystallized three times from ethyl acetate and Skellysolve B hexanes to give 6β-fluoro-17α,21-dihydroxy-4-pregnene-3,11,20-trione.

Substitution of the corresponding 6α-epimer for the starting material above is productive of 6α-fluoro-17α,21-dihydroxy-4-pregnene-3,11,20-trione. Alternatively, the 6α-epimer can be obtained from the corresponding 6β-product by the procedure of Preparation 9.

EXAMPLE 1

6α - fluoro - 11β,17α,21 - trihydroxy - 4 - pregnene - 3,20-dione 21-methanesulfonate (II)

To a solution of 770 milligrams of crude 6α-fluoro-11β,17α,21-trihydroxy-4-pregnene-3,20-dione (I) in ten milliliters of pyridine previously cooled to zero to five degrees centigrade was added 0.7 milliliter of methanesulfonyl chloride. The reaction mixture was stirred in an ice-water bath for four hours. Dilution with 100 milliliters of five percent hydrochloric acid precipitated the crystalline mesylate (II). The product, after filtration, weighed 900 milligrams and melted at 189 to 192 degrees (with decomposition). Infrared analysis in mineral oil mull showed adsorptions as follows: 3560, 3420 centimeters$^{-1}$ (OH); 1725 centimeters$^{-1}$ (20-ketone); 1655 centimeters$^{-1}$ (Δ$^4$-3-ketone); 1640, 1617 centimeters$^{-1}$ (C=C); 1350, 1200, 1170 centimeters$^{-1}$ (—OSO$_2$—).

EXAMPLE 2

6α,21 - difluoro - 11β,17α - dihydroxy - 4 - pregnene - 3,20 - dione (6α,21 - difluoro - 21 - desoxyhydrocortisone) (III)

A mixture of 200 milligrams of 6α-fluoro-11β,17α-dihydroxy-4-pregnene-3,20-dione 21-methanesulfonate (II) and 100 milligrams of potassium fluoride in two milliliters of dimethylsulfoxide was heated on a steam bath for seventeen hours. The reaction mixture was diluted with fifty milliliters of methylene chloride and washed three times with ten milliliters of water. After drying over sodium sulfate, the methylene chloride solution was passed over a column of ten grams of synthetic magnesium silicate. Elution with Skellysolve B hexanes plus nine percent acetone (four fractions of twenty milliliters each) gave 28 milligrams of crude crystals identified by infrared data as 6α-fluoro-11β-hydroxy-17α,21-epoxy-4-pregnene-3,20-dione (VI). The infrared adsorption maximums in mineral oil mull were as follows: 3410 centimeters$^{-1}$ (OH); 1807 centimeters$^{-1}$ (C=O, 4-membered ring); 1660 centimeters$^{-1}$ (Δ$^4$-3-keto); 1625 centimeters$^{-1}$ (C=C).

Further elution with Skellysolve B hexanes plus twelve and fifteen percent acetone yielded 45 milligrams of 6α,21 - difluoro - 11β,17α - dihydroxy - 4 - pregnene - 3,20-dione (III), which on recrystallization from ethyl acetate-Skellysolve B hexanes gave 29 milligrams of product (III), melting point 226 to 230 degrees centigrade. Infrared adsorption showed the following maximums: 3600, 3540, 3360 centimeters$^{-1}$ (OH); 1722 centimeters$^{-1}$ (20-ketone); 1653 centimeters$^{-1}$ (Δ$^4$-3-ketone); 1625 centimeters$^{-1}$ (C=C).

EXAMPLE 3

6α,21 - difluoro - 17α - hydroxy - 4 - pregnene - 3,11,20-trione (6α,21-difluoro-21-desoxycortisone) (V)

A solution is prepared containing 0.5 gram of 6α,21-difluoro - 11β,17α - dihydroxy - 4 - pregnene - 3,20 - dione, 0.15 gram of chromium trioxide, ten milliliters of glacial acetic acid and one-half milliliter of water. This mixture is stirred and maintained at room temperature for eight hours. Thereafter the mixture is poured into fifty milliliters of ice water, neutralized by the addition of dilute sodium hydroxide, and the thus obtained precipitate collected on a filter and recrystallized three times from ethyl acetate and Skellysolve B hexanes to give 6α,21 - difluoro - 17α - hydroxy - 4 - pregnene - 3,11,20-trione (V).

Alternatively, 6α,21-difluoro-17α-hydroxy-4-pregnene-3,11,20-trione (V) can be produced by employing 6α-fluoro-17α-hydroxy-4-pregnene-3,11,20-trione as the starting material in Example 1 and following the procedures of Examples 1 and 2.

EXAMPLE 4

6α,21-difluoro-11β,17α - dihydroxy - 4 - pregnene-3,20-dione (6α,21-difluoro - 21 - desoxyhydrocortisone) (IV) and 6α,21-difluoro-17α-hydroxy-4-pregnene-3,11,20-trione (6α,21-difluoro-21-desoxycortisone) (V)

In the same manner as shown in Example 1, treating 6α-fluoro-11β,17α,21-trihydroxy - 4 - pregnene-3,20-dione with methanesulfonyl chloride in pyridine solution yields 6α-fluoro-11β,17α,21-trihydroxy - 4 - pregnene-3,20-dione 21-methanesulfonate. Refluxing the said 21-methanesulfonate with potassium iodide in acetone solution gives 6α-fluoro-11β,17α-dihydroxy-21-iodo - 4 - pregnene-3,20-dione. Reacting the thus obtained 6α-fluoro-11β,17α-dihydroxy-21-iodo-4-pregnene-3,20-dione in acetonitrile solution with aqueous silver fluoride solution produces 6α,21-difluoro-11β,17α-dihydroxy-4-pregnene-3,20-dione (IV).

Substitution of 6α-fluoro-17α,21-dihydroxy-4-pregnene-3,11,20-trione as the starting material in the foregoing reactions of Example 4 is productive of 6α,21-difluoro-17α-hydroxy-4-pregnene - 3,11,20 - trione. Alternatively, 6α,21-difluoro-11β,17α-dihydroxy - 4 - pregnene-3,20-dione can be oxidized to 6α,21-difluoro-17α-hydroxy-4-pregnene-3,11,20- trione (V), as indicated in Example 3.

EXAMPLE 5

6β-epimers

Substituting 6β-fluorohydrocortisone for the starting material in Example 1 and maintaining the reaction conditions near neutral, 6β-epimers, such as 6β,21-difluoro-11β,17α-dihydroxy-4-pregnene-3,20-dione and 6β,21-difluoro-17α-hydroxy - 4 - pregnene-3,11,20-trione, are produced which can be isolated from the reaction mixture. The thus obtained 6β-epimers yield the 6α-epimers by treatment, at temperatures of zero degrees centigrade or slightly lower and in an organic solvent such as chloroform, with an anhydrous mineral acid, such as hydrochloric acid, in the presence of alcohol. The lower temperatures should be maintained throughout the period of acid addition. Purification by washing with successive portions of dilute alkali followed by evaporation under reduced pressure gives the 6α-epimer in high yield.

This application is a continuation-in-part of copending application Serial No. 699,468, filed November 29, 1957, now Patent No. 2,838,535 issued June 10, 1958.

It is to be understood that the invention is not to be limited to the exact details of operation or exact compounds shown and described, as obvious modifications and equivalents will be apparent to one skilled in the art. The invention is therefore to be limited only by the scope of the appended claims.

We claim:

1. A 6-fluoro-17α,21-epoxy-4-pregnene of the following structural formula:

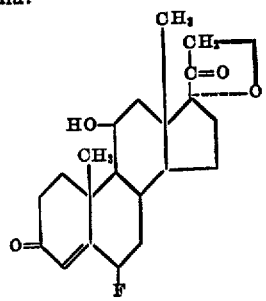

2. 6α-fluoro-11β-hydroxy-17α,21-epoxy - 4 - pregnene-3,20-dione.

No references cited.